United States Patent [19]

Okimoto et al.

[11] 4,222,891

[45] Sep. 16, 1980

[54] METHOD OF MAKING OIL-CONTAINING MICROCAPSULES

[75] Inventors: Tomoyuki Okimoto, Takarazuka; Tomoharu Shiozaki, Amagasaki; Makoto Miyake, Nishinomiya, all of Japan

[73] Assignee: Kanzaki Paper Mfg. Co., Ltd., Tokyo, Japan

[21] Appl. No.: 892,318

[22] Filed: Mar. 31, 1978

[30] Foreign Application Priority Data

Aug. 17, 1977 [JP] Japan .................................. 52-98924
Nov. 25, 1977 [JP] Japan ................................. 52-142011

[51] Int. Cl.$^2$ ............................................. B01J 13/02
[52] U.S. Cl. ................................... 252/316; 282/27.5; 428/307; 428/914
[58] Field of Search ................ 252/316; 428/307, 914

[56] References Cited

U.S. PATENT DOCUMENTS

| | | | |
|---|---|---|---|
| 2,886,446 | 5/1959 | Kramer et al. | 426/5 |
| 3,041,289 | 6/1962 | Katchen et al. | 252/316 |
| 3,687,865 | 8/1972 | Katayama et al. | 252/316 |
| 3,738,857 | 6/1973 | Brockett et al. | 252/316 X |

FOREIGN PATENT DOCUMENTS

| | | | |
|---|---|---|---|
| 51-118509 | 10/1976 | Japan | 428/307 |
| 1455576 | 11/1976 | United Kingdom | 252/316 |

*Primary Examiner*—Richard D. Lovering

*Attorney, Agent, or Firm*—Cushman, Darby & Cushman

[57] ABSTRACT

The method of making oil-containing microcapsules comprises the step of (1) preparing an aqueous system comprising an aqueous solution of gelatin and at least one anionic colloid material and oil droplets dispersed in said solution (2) causing coacervation in said aqueous system at a temperature above the gelation point of said gelatin to form a coacervate suspension in which each of said oil droplets is surrounded by a coacervate and (3) cooling said coacervate suspension to a temperature below the gelation points of said gelatin to form multinucleus capsules. During the step of cooling the coacervate suspension, aggregation of particles of oil droplets each having a coacervate therearound is controlled by an agitation flow so as to allow formation of multinucleus microcapsules having an average diameter within the range of 3 to 20 microns. The gelatin has an average viscosity not larger than 35 millipoise in terms of the value measured by the bloom type pipette method at 40°±0.5° C. according to Japan Industrial Standard K 6503 with respect to a 6⅔% aqueous solution of said gelatin at the pH of 4.5 and at least 5% by weight of said gelatin has a viscosity not larger than 25 millipoise in said terms and/or the anionic colloid material is a carboxymethylcellulose having a viscosity within the range of 2 to 500 centipoise measured by the Brookfield viscometer with a 60 r.p.m. No. 1 rotor with respect to a 2% aqueous solution of said carboxymethylcellulose at 25° C.

20 Claims, 2 Drawing Figures

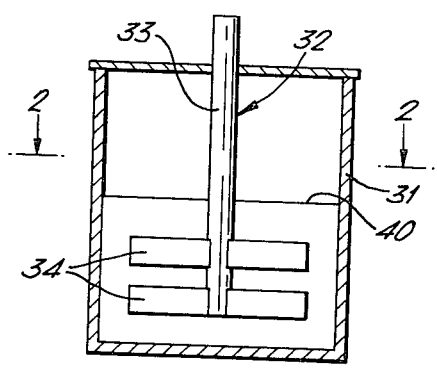
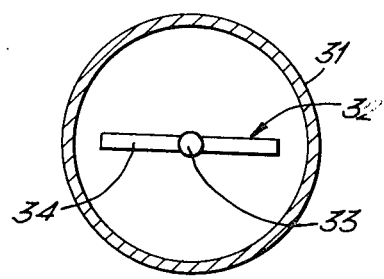

METHOD OF MAKING OIL-CONTAINING MICROCAPSULES

BACKGROUND OF THE INVENTION

This invention relates to a method of making microcapsules containing water-immiscible oil droplets and more particularly to an improved method of making multi-nucleus microcapsules formed by aggregation of such mono-nucleus microcapsules which are useful for the manufacture of pressure-sensitive copying papers.

Pressure-sensitive copying papers and heat-sensitive recording papers which utilize the colour developing reaction between electron donating organic chromogenic material (hereinafter referred to as "colour former") and electron accepting acidic reactant material (hereinafter referred to as "acceptor") are now widespread. In pressure-sensitive copying paper at least one of the colour former and the acceptor is contained in microcapsules so as to be isolated from the other and they become into contact with each other by rupturing such microcapsules to develop a colour. In a most typical type of pressure-sensitive copying paper minute oil droplets in which the colour former is dispersed or dissolved are encapsulated and coated onto papers.

Pressure-sensitive copying papers found their usefulness in a variety of commercial material applications. For example, they are very useful as computer output recording papers, business forms and copying slips. In these arts one of the requirements in the quality is that the copying can be done at one time and under usually applied pressure for as many superposed sheets of paper as possible. This requirement, however, involves a disadvantage that paper sheets are easily smudged by inadvertent pressure during storage, handling and shipping. There has been proposed pressure sensitive copying paper having a coating layer of multi-nucleus microcapsules, e.g., as disclosed in U.S. Pat. No. 3,041,289 and Japan Kokai (Laid Open Patent Publication) No. 118,509 of 1976. The conventional technique of making the multi-nucleus microcapsules has never been able to resolve the antinomic problem that the copying capacity of the multilayered copying paper sheets should be increased while preventing the copying paper sheets from being smudged by inadvertent pressure.

The most typical method for making oil-containing microcapsules is to utilize the coacervation technique. For example, according to the disclosure in U.S. Pat. No. 2,800,457 oil-containing microcapsules are made by the following steps:

(1) A mixture of two different hydrophilic colloid sols in which oil droplets are dispersed is prepared. The mixture may be made by forming an aqueous sol of one colloid material, emulsifying the selected oil therein, and mixing the emulsion with an aqueous sol of another colloid material, or the two sols may be made and mixed and the oil emulsified therein. The two colloid materials are gellable and have opposite electric charges.

(2) Coacervation is caused by dilution and/or by adjusting the pH of the mixture to form and adhere to coacervate around each of the oil droplets.

(3) The coacervate around each of the oil droplets is gelled by cooling; and (4) The coacervate is further hardened by addition of a hardening agent or by adjusting the pH to an alkaline zone.

It is considered that in order to resolve the beforementioned antinomic problem it is imperative to obtain oil-containing microcapsules having selected and generally uniform particle sizes within a limited range. The particle size of the microcapsules obtained by the above mentioned coacervation technique depends on various factors such as the temperature and the pH of the system, the colloid concentration in the system, the kinds of colloid materials used and the composition ratio of the oil and the colloid materials. It is our conclusion after substantial investigations and experiments that it would be impossible or extremely difficult to obtain microcapsules having desired and generally uniform particle sizes with chemical adjustment of any of the above mentioned factors alone.

In the U.S. patent application filed by Makoto Miyake et al. on Jan. 27, 1978 with claim to the Convention Priority of Japanese patent application No. 9,022 of 1977 filed on Jan. 28, 1977, it has been proposed to control aggregation of particles of oil droplets each having a coacervate therearound by an agitation flow produced by extremely slowly rotating an agitator in a vessel containing the coacervate suspension whereby multi-nucleus capsules having desired diameters and desired particle size uniformity may be obtained owing to an appropriate balance between the adhesion force of coacervate and the separation force given by the control agitation flow. This method for controlling aggregation by agitation is advantageous because its operation is simple. However, we have found that formation of multi-nucleus microcapsules is highly affected by the viscosity of the solution for coacervation at a high temperature and the behaviour of coacervates toward gelation during the cooling step.

The primary object of the invention is to provide an improved method of making multi-nucleus oil-containing microcapsules having selected and generally uniform particle sizes as desired.

Another object of the invention is to provide an improved method of controlling the particle size and its uniformity of the multi-nucleus oil-containing microcapsules as desired through the utilization of a specified agitation flow during the steps of making oil-containing microcapsules according to the coacervation technique.

A further object of the invention is to provide an improved method of controlling the particle size and its uniformity of the multi-nucleus oil-containing microcapsules with use of specified colloid materials in addition to the utilization of the above mentioned agitation flow.

A still further object of the invention is to provide an improved method for the production of pressure-sensitive copying paper sheets which have an improved recordability for multi-layered or thick copying paper sheets while preventing those paper sheets to the utmost extent from being soiled or smudged by an inadvertent pressure applied.

Other objects and advantages of the invention will be apparent from the following detailed description.

SUMMARY OF THE INVENTION

According to the invention in the method of making oil-containing microcapsules comprising the steps of (1) preparing an aqueous system comprising an aqueous solution of gelatin and at least one anionic colloid material and oil droplets dispersed in said solution (2) causing coacervation in said aqueous system at a temperature above the gelation point of said gelatin to form a coacervate suspension in which each of said oil droplets is surrounded by a coacervate and (3) cooling said coacervate suspension to a temperature below the gelation point of said gelatin to form multi-nucleus capsules, aggregation of particles of oil droplets each having a coacervate therearound is controlled, during the step of cooling the coacervate suspension, by an agitation flow so as to allow formation of multi-nucleus microcapsules having an average diameter within the range of 3 to 20 microns.

In one aspect of the invention the gelatin has an average viscosity not larger than 35 millipoise in terms of the value measured by the bloom type pipette method at 40°±0.5° C. according to Japan Industrial Standard K-6503 with respect to a 6⅔% aqueous solution of said gelatin at the pH of 4.5 and at least 5% by weight of the gelatin has a viscosity not larger than 25 millipoise in said terms.

In another aspect of the invention carboxymethylcellulose is used as an anionic colloid material. The carboxymethylcellulose has a viscosity within the range of 2 to 500 centipoise measured by the Brookfield viscosimeter with a 60 r.p.m. No. 1 rotor with respect to a 2% aqueous solution of it at 25° C.

BRIEF DESCRIPTION OF THE DRAWINGS

FIG. 1 is schematic vertical sectional view of an agitation vessel which is used in the examples hereinafter described and FIG. 2 is a sectional view taken along the lines 2—2 of FIG. 1.

DETAILED DESCRIPTION OF THE INVENTION

The first step of the method of making oil-containing microcapsules according to the invention is to prepare an aqueous system comprising an aqueous solution of gelatin and at least one anionic colloid material. Such the aqueous system like this may be prepared either by forming aqueous sol of gelatin or an anionic colloid material, emulsifying the selected oil therein, and mixing the emulsion with an aqueous sol of another colloid material, or, by forming a mixed sol of gelatin and anionic colloid material and emulsifying the oil therein.

In case of the manufacture of microcapsules for use in pressure-sensitive copying paper a colour former and/or an acceptor is dispersed or dissolved in the oil droplets.

The oil may be any of conventional ones. For example animal oils such as fish oil and lard oil; vegetable oils such as castor oil, soybean oil, linseed oil, earth-nut oil and corn oil; mineral oils such as kerosene, naphtha and paraffin oil; synthetic oils such as alkylated naphthalene, alkylated biphenyl, hydrogenated terphenyl and alkylated diphenylmethane and the like may be used either solely or in combination.

Among the useful colour former compounds there may be included triarylmethane derivatives such as 3,3-bis(p-dimethylaminophenyl)-6-dimethylaminophthalide (CVL), 3,3-bis(p-dimethylaminophenyl)phthalide, 3-(p-dimethylaminophenyl)-3-(1,2-dimethylindole-3-yl)phthalide, 3-(p-dimethylaminophenyl)-3-(2-methylindole-3-yl)phthalide, 3,3-bis-(1,2-dimethylindole-3-yl)-5-dimethylaminophthalide, 3,3-bis-(1,2-dimethylindole-3-yl)-6-dimethylaminophthalide, 3,3-bis(9-ethylcarbazole-3-yl)-5-dimethylaminophthalide, 3,3-bis-(2-phenylindole-3-yl)-5-dimethylaminophthalide and 3-p-dimethylaminophenyl-3-(1-methylpyrrole-2-yl)-6-dimethylaminophthalide, diphenylmethane derivatives such as 4,4'-bis-dimethylaminobenzhydrinebenzylether, N-halophenyl-leucoauramine and N-2,4,5-trichlorophenyl-leucoauramine, xanthene derivatives such as rhodamine-B-anilinolactam, rhodamine-(p-nitroanilino)lactam, rhodamine-(p-chloroanilino)lactam, 3-dimethylamino-7-methoxyfluoran, 3-diethylamino-6-methoxyfluoran, 3-diethylamino-7-methoxyfluoran, 3-diethylamino-7-chlorofluoran, 3-diethylamino-7-chloro-6-methylfluoran, 3-diethylamino-6,8-dimethylfluoran, 3-diethylamino-7-(acetylmethylamino)fluoran, 3-diethylamino-(7-methylamino) fluoran, 3,7-diethylaminofluoran, 3-diethylamino-7-(diebenzylamino)fluoran, 3-diethylamino-7-(methylbenzylamino) fluoran, 3-diethylamino-7-(chloroethylmethylamino)fluoran and 3-diethylamino-7-(diethylamino)fluoran, thiazine derivatives such as benzoylleuco-methyleneblue and p-nitrobenzyl-leucomethylene blue, and spiro-compounds such as 3-methyl-spiro-dinaphtopyrane, 3-ethyl-spiro-dinaphthopyrane, 3,3'-dichloro-spiro-dinaphthopyrane, 3-benzylspiro-dinaphthopyrane, 3-methyl-naphtho(3-methoxy-benzo)-spiropyrane and 3-propyl-spiro-dibenzopyrane.

These compounds may be used either solely or in combination.

Among the useful acceptor compounds there may be included inorganic acid materials such as acid clay, activated clay, attapulgite, silica, zeolite, bentonite and aluminum silicate, and organic acceptors such as phenolic compounds and phenol resins, e.g., phenol-aldehyde polymers and phenol-acetylene polymers and polyvalent metal salts of phenol resins as disclosed in U.S. Pat. Nos. 3,516,845 and 3,732,120; aromatic carboxylic acids, e.g., benzoic acid, salicylic acid, 3,5-di-tert-butyl salicylic acid, 3-phenyl-5-(α, α-dimethylbenzyl)salicylic acid, 3,5-di(α-methylbenzyl)salicylic acid, and 1-hydroxyl-2-carboxynaphthalene, and polyvalent metal salts of aromatic carboxylic acids as disclosed in U.S. Pat. Nos. 3,864,146, 3,924,027 and 3,983,292; and aromatic carboxylic acid-aldehyde polymers, aromatic carboxylic acid-acetylene polymers, and their polyvalent metal salts as disclosed in U.S. Pat. Nos. 3,767,449 and 3,772,052. These compounds may also be used either solely or in combination.

Among the anionic colloid materials which are used together with gelatin according to the invention there may be included natural and synthetic hydrophilic colloids such as cellulose derivatives, for example carboxymethylcellulose, carboxyethylcellulose, carboxymethylethylcellulose, carboxymethylhydroxyethylcellulose and sulfonated cellulose; gum arabic; carrageenan; sodium alginate; carboxymethylated starch; phosphated starch; styrene-maleic anhydride copolymer and methylvinylether-maleic anhydride copolymer. Among those hydrophilic colloids cellulose derivatives modified with carboxyl are preferred. The most preferred one is carboxymethylcellulose.

The particle size of the emulsified oil droplets as mono-nuclei for microcapsules may be within the range of 1 to 10 microns, preferably, within the range of 1.5 to 5 microns in terms of the diameter measured by Coulter Counter, Model TA manufactured by Coulter Electronics Inc., USA.

The emulsifying step may be effectively carried out by using any of conventional agitators or stirrers such as homogenizer, propeller mixer and Warren blender.

In some cases any of surfactants such as sodium alkylbenzenesulfonate, sodium salt of naphthalenesulfonic acid-formaldehyde condensate, sodium alkylsulfate, potassium ligninsulfonate, sodium oleate and sulfonated oil may be used in the emulsifying step.

The next step to make microcapsules is to cause coacervation in the aqueous system thus prepared to form a coacervate suspension in which a coacervate is deposited on and around each of the oil droplets. The coacervation may be caused by dilution and/or by adjusting the pH of the system.

The amount of water to be added for dilution may be decided as desired according to the coacervation conditions required, but usually water is added in such an amount as to reduce the colloid concentration in the system to 2 to 5% by weight.

The pH value for causing coacervation depends on the kind of the anionic colloid material to be used. Generally, the pH of the system may be adjusted within the range of 4.0 to 6.0.

The sufficient agitation during the coacervation step is also preferred for the purpose of preventing formation of coacervate aggregation masses of undesirably great dimensions.

It must be noted that the temperature of the system must be maintained above the gelation points of gelatin throughout the emulsifying and coacervation steps. Usually the temperature of the system may preferably be maintained at a constant temperature fairly above the gelation points of gelatin.

The coacervate suspension is then cooled with a gentle temperature gradient until a temperature below the gelation points of gelatin to gel the coacervate deposited around each of the oil droplets to obtain fixed capsules. In this process individual coacervates tend to adhere to each other.

In some cases many individual coacervates are adhered to each other to form multi-nucleus capsules of undesirably great diameters. In another some cases formation of multi-nucleus capsules is prevented by an undesirably strong external force applied.

According to the invention, aggregation of particles of oil droplets with coacervates is precisely controlled by a specified agitation flow applied to the system so that multi-nucleus capsules having desired diameters and desired particle size uniformity may be obtained. This is owing to an appropriate balance between the adhesion force of coacervates and the separation force given by the controlled agitation flow. At least all during the step of cooling the coacervate suspension the agitation flow applied must be so controlled as to only allow formation of microcapsule aggregation masses having an average particle diameter of 3 to 20 microns, preferably, 6 to 15 microns. The average particle diameter mentioned in this specification means the particle size in terms of an average value of the particle diameters calculated from the particle size distribution measured by Coulter Counter, Model TA manufactured by Coulter Electronics Inc., USA.

It has been observed and confirmed that if the average particle diameter of each of the microcapsule aggregation masses is smaller than 3 microns the colour developing ability is insufficient and if the average diameter of each of the microcapsule aggregation masses is greater than 20 microns the copying paper sheets are easily smudged by inadvertent pressure applied.

According to the invention the above mentioned specifically controlled agitation flow may preferably be produced by rotating at least one agitator having at least one vane in a vessel containing the coacervate suspension under the following conditions:

$$0.3 \leq (2a/D) < 1$$

$$0.05 \leq (Sp/ST) < 1$$

$$5 \leq n \leq 200$$

In the above formulas D is the maximum inner diameter of the vessel, a is the maximum radius of gyration of the agitator, ST is the maximum vertical sectional area of the coacervate suspension in the vessel, Sp is the maximum vertical sectional area of the agitator vane rotating space and n is the number of the revolutions per minute of the agitator. If the agitator has two or more radially extending vanes or two or more agitators are used in a single vessel, the value Sp should be the total of the respective maximum vertical sectional areas of the vanes. In the calculation of Sp the vertical sectional area of the rotating shaft may be excluded.

According to the invention, the particle size distribution can be concentrated to such extremely narrow ranges that more than 75%, at maximum more than 90%, of the particles belong to the peak channel and its adjoining channels in the volume integration of the particles measured by Coulter Counter.

That is, the particle size of the multi-nucleus capsules can be precisely controlled by selection of certain gelatin having a viscosity within a specified range in the system utilizing gelatin and anionic polymer colloid material. The viscosity of the useful gelatin for this purpose should be such that at least 5%, preferably 10%, by weight of the gelatin has a viscosity not larger than 25 millipoise and the average viscosity of the whole gelatin is not larger than 35 millipoise, preferably, within the range of 15 to 35 millipoise. The viscosity of the gelatin herein described is the value measured by the bloom type pipette method at 40°±0.5° C. according to Japan Industrial Standard K 6503 with respect to a 6 $\frac{2}{3}$% aqueous solution of the gelatin at the pH of 4.5. The gelatin used may be either a single component having a uniform viscosity or a blended one consisting of a plurality of components having different viscosities.

If the amount of the component having a viscosity not larger than 25 millipoise is smaller than 5% by weight, it is difficult at high temperature to highly precisely control the particle size of the multi-nucleus capsules as desired even with use of the whole gelatin having an average viscosity within the specified range. On the other hand, in case where the average viscosity of the whole gelatin is larger than 35 millipoise, it would become necessary to reduce the colloid concentration of the system to a substantial extent so that gelation of the whole system after cooling may be prevented. If the average viscosity of the whole gelatin is reduced to an extremely low degree, the practical properties such as heat resistance, moisture resistance and friction resistance of capsules are substantially degraded. Accordingly, the preferred average viscosity of the whole gelatin is not smaller than 15 millipoise, preferably, not smaller than 20 millipoise.

In the production of gelatin different extraction batches provide products having different viscosities. It is conventional to blend a plurality of gelatin products from different batches having different viscosity according to practical uses. For the purpose of making microcapsules a blended gelatin consisting of some different extractions having different, relatively higher viscosities has been conventionally used for effective coacervation and formation of stable capsules. However, there has heretofore been no knowledge of blending gelatin components having different viscosities and utilizing gelatin components having relatively low viscosities for the purpose of effectively controlling the particle size of the multi-nucleus microcapsules.

Further, proper selection of carboxymethylcellulose (hereinafter merely referred to as "CMC") having a viscosity within the specified range in the system utilizing the above mentioned gelatin and CMC is unexpectedly effective to precisely control the particle size of the multi-nucleus capsules formed. Proper selection of the viscosity of CMC enables the particle size of the multi-nucleus capsules to be precisely controlled even at a relatively high colloid concentration, so as to have desired, highly uniform average diameters.

The specified range of the viscosity of CMC is 2 to 500 centipoise, preferably, 3 to 100 centipoise. The viscosity values described are those measured by the Brookfield viscometer with a 60 r.p.m. No. 1 rotor with respect to a 2% aqueous solution of the system at 25° C. If the viscosity of CMC used is larger than 500 centipoise, it would become necessary to reduce the colloid concentration of the system to a substantial extent so that gelation of the whole system after cooling may be prevented. On the other hand if the viscosity of CMC is reduced to an extremely low degree, the coacervation rate is lowered and the practical properties such as heat resistance, moisture resistance and friction resistance of the capsules are substantially degraded. Accordingly, the viscosity of CMC used should be not smaller than 2 centipoise.

Various kinds of CMC products having different viscosities are commercially available. It is conventional to use any of those CMC products as a microcapsule wall film forming material. However, there has heretofore been no knowledge of controlling the particle size of the multi-nucleus microcapsules by selection of CMC having a viscosity within a limited and specified range.

The viscosity of CMC is important relative to the viscosity of gelatin co-used. It has also been found that the particle size of the multi-nucleus capsules can be most effectively controlled by selection of CMC and gelatin having the following relative viscosities, respectively:

| CMC viscosity (centipoise) | Gelatin average viscosity (millipoise) |
|---|---|
| below 18 | below 28 |
| below 10 | below 35 |
| below 6 | below 50 |

As described before, gelatin having an average viscosity larger than 35 millipoise is not desirable. It will however be observed that at proper selection of the viscosity of CMC enables gelatin having an average viscosity larger than 35 millipoise to be practically used while maintaining a good control of the particle size of the multi-nucleus capsules as desired.

Referring now to the drawings, the reference numeral 31 indicates vessels, the reference numeral 32 generally indicates agitator rotatable in the vessels 31. The vessel may preferably be provided with suitable cooling means. The agitator 32 comprises a rotating shaft 33 and agitation vanes 34 fixed to the shaft 33. The reference numeral 40 indicates the level of the liquid in the vessel.

The vane 34 of the agitator 32 may be shaped in any form as desired. For example, the vane 34 is shaped in any flat plate form, in any straight bar form, in any frame form or in any screw form.

The agitator 32 may rotate either about a vertical axis or about a horizontal axis. The agitator of the horizontal axis type is advantageous for a continuous treatment of the liquid.

The vessel 31 may be provided with at least one projection or stationary vane which cooperates with the vane 34 of the agitator 32 to effectively produce a turbulent flow.

The plurality of agitators may also be assembled in a single vessel.

DETAILED DESCRIPTION OF THE PREFERRED EMBODIMENT

The following examples serve to illustrate the invention in more detail although the invention is not limited to the examples. Unless otherwise indicated, parts and % signify parts by weight and % by weight, respectively.

EXAMPLES 1 TO 10 AND CONTROLS 1 TO 6

10 parts of an acid-treated gelatin mixture consisting of the gelatines with various viscosities as shown in Table 1 was added to 87 parts of water. After standing for one hour at 20° C., the mixture was heated at 60° C. to prepare a gelatin solution. 1.2 parts of crystal violet lactone and 0.6 parts of benzoyl leucomethylene blue were dissolved in a mixed oil consisting of 15 parts of kerosene and 33 parts of isopropylnaphthalene to prepare a color former solution. The color former solution was, after being heated at 60° C., added to the gelatin solution and the mixture was emulsified with a homomixer so as to obtain oil droplets having an average particle size of 3.0 microns. To the emulsion 40 parts of carboxymethylcellulose having an etherification degree of 0.75 and a viscosity of 9 cp at 25° C. in state of 2% aqueous solution and 160 parts of warm water of 55° C. were added. The pH of the aqueous system thus obtained was adjusted to 5.4–5.6 with a 0.25 N NaOH solution. The aqueous system was poured into an agitator vessel as shown in FIGS. 1 and 2. While agitation was being carried out under the following conditions, the system in the vessel was gradually cooled from the initial temperature of 50° C. with a temperature drop gradient of 1° C. per 3 minutes:

$(2a/D) = 0.75$ $(Sp/ST) = 0.24$ $n = 100$

The aqueous system was continuously cooled until 10° C. To the system maintained at 10° C., 2 parts of 50% aqueous solution of glutaric aldehyde was added and then the pH of the system was adjusted to 6.0 with an aqueous solution of caustic soda to complete the hardening of capsules. The particle size distribution of the multi-nucleus capsules thus obtained at 10° C. was measured by Coulter Counter to examine the controllability of the particle size. The results were shown in Table 1.

A formability of multi-nucleus capsules was calculated by the following formula:

$$\text{Formability of multi-nucleus capsules (\%)} = \frac{\text{the average particle diameter at 45° C.}}{\text{the average particle diameter at 10° C.}} \times 100$$

When the calculated value was large the particle size of capsules could be easily controlled. The controllability of particle size at 10° C. was represented with the volume percentage of the particles included in the channel of the peak and its adjoining channels in the chart of Coulter Counter. The larger the volume percentage, the narrower the distribution of particle size.

As shown in Table 1, there was obtained in each Example a multi-nucleus capsule dispersion in which the particles had a desired particle size and the particle size distribution was very sharp.

aqueous solution of CMC having a viscosity and an etherification as shown in Table 2 and 160 parts of warm water of 55° C. were added. The aqueous system thus obtained was adjusted to pH 5.0 to 5.6 with a 0.25 N NaOH solution. The aqueous system was poured into a vessel as shown in FIGS. 1 and 2. While agitation was being carried out under the following conditions, the system in the vessel was gradually cooled from the initial temperature of 50° C. with a temperature drop gradient of 1° C. per 3 minutes:

$(2a/D) = 0.75$ $(Sp/ST) = 0.24$ $n = 100$

The aqueous system was continuously cooled until 10° C. To the system maintained at 10° C., 2 parts of 50% aqueous solution of glutaric aldehyde was added and then the pH of the system was adjusted to 6.0 with an aqueous solution of caustic soda to complete the hardening of capsules. The particle size distributions of the capsules obtained at 45° C. and 10° C. during the cooling step were measured by Coulter Counter to examine controllability of the particle size of the multi-nucleus capsules. The results were shown in Table 2 with a formability of multi-nucleus capsules and controllability of particle size at 10° C. As shown in Table 2, there was obtained in each Example according to the invention multi-nucleus capsule dispersion in which particles had a desired particle size and the particle size distribution was very sharp.

TABLE 1

| | Gelatin Components (%) | | | | | | | | Average viscosity (mp) | Average particle diameter (microns) | | Formability of multi-nucleus capsules at 45° C. (%) | Controllability of particle size at 10° C. (%) |
|---|---|---|---|---|---|---|---|---|---|---|---|---|---|
| | 49mp | 41mp | 36mp | 32mp | 28mp | 25mp | 22mp | 16mp | | 45° C. | 10° C. | | |
| Example 1 | | | | | | 100 | | | 25 | 8.2 | 10.8 | 80 (%) | 85 (%) |
| Example 2 | | | | | | | 100 | | 22 | 7.6 | 9.4 | 81 | 92 |
| Example 3 | | | | | | | | 100 | 16 | 9.4 | 10.8 | 87 | 94 |
| Example 4 | | 10 | 24 | 25 | 34 | 7 | | | 33 | 7.0 | 9.6 | 73 | 79 |
| Example 5 | | 5 | 20 | 30 | 40 | | 5 | | 31 | 6.8 | 8.9 | 71 | 82 |
| Example 6 | | 5 | 15 | 35 | 35 | | 10 | | 32 | 6.9 | 9.1 | 76 | 85 |
| Example 7 | 25 | | 25 | | 25 | | 25 | | 34 | 5.7 | 8.2 | 70 | 80 |
| Example 8 | | 25 | 25 | | 25 | | 25 | | 27 | 8.4 | 9.5 | 88 | 89 |
| Example 9 | | | 25 | 25 | 25 | 25 | | | 26 | 6.7 | 8.8 | 76 | 91 |
| Example 10 | | | | | 5 | 15 | 20 | 60 | 19 | 10.2 | 12.0 | 85 | 92 |
| Control 1 | 100 | | | | | | | | 49 | 3.2 | 11.0* | 29 | 36* |
| Control 2 | | 100 | | | | | | | 36 | 3.5 | 10.8* | 34 | 35* |
| Control 3 | | | | 100 | | | | | 28 | 4.4 | 12.0* | 37 | 45* |
| Control 4 | | 10 | 20 | 30 | 40 | | | | 30 | 3.7 | 10.6* | 35 | 40* |
| Control 5 | 50 | 15 | 10 | | | 25 | | | 40 | 3.4 | 9.7* | 35 | 42* |
| Control 6 | 75 | | | | | | | 25 | 36 | 4.2 | 8.0* | 53 | 62* |

(Note)
*The test was carried out after removing gel, as the dispersion obtained in Controls was partially gelled.

EXAMPLES 11 TO 23 AND CONTROLS 7 TO 10

10 parts of an acid-treated gelatin having an average viscosity as shown in Table 2 was added to 87 parts of water. After standing for one hour at 20° C., the mixture was heated at 60° C. to prepare a gelatin solution. 1.2 parts of crystal violet lactone and 0.6 parts of benzoyl leucomethylene blue were dissolved in a mixed oil consisting of 15 parts of kerosene and 33 parts of isopropylnaphthalene to prepare a color former solution. The color former solution, after being heated at 60° C., added to the gelatin solution and the mixture was emulsified by a homomixer so as to obtain oil droplets having an average particle diameter of 3.0 microns. To the emulsion under continued agitation 40 parts of 2.5%

TABLE 2

| | Average viscosity of gelatin (mp) | Carboxymethyl cellulose | | | Average particle diameter (microns) | | Formability of multi-nucleus capsule at 45° C. (%) | Controllability of particle size at 10° C. (%) |
|---|---|---|---|---|---|---|---|---|
| | | viscosity (cp) | pH* | etherification degree | 45° C. | 10° C. | | |
| Example 11 | 16 | 9 | 6.9 | 0.76 | 8.4 | 9.4 | 89 | 97 |
| Example 12 | 16 | 16 | 6.9 | 0.76 | 7.4 | 9.3 | 80 | 92 |
| Example 13 | 16 | 82 | 7.1 | 1.02 | 9.3 | 13.0 | 72 | 92 |
| Example 14 | 16 | 210 | 7.1 | 0.99 | 5.9 | 8.6 | 69 | 85 |
| Example 15 | 16 | 485 | 7.1 | 1.00 | 5.3 | 9.6 | 55 | 81 |
| Example 16 | 18 | 10 | 6.8 | 0.76 | 9.4 | 10.8 | 87 | 94 |
| Example 17 | 20 | 10 | 6.8 | 0.62 | 7.6 | 9.4 | 81 | 92 |
| Example 18 | 28 | 6 | 6.6 | 0.76 | 8.2 | 9.8 | 84 | 93 |

TABLE 2-continued

| | Average viscosity of gelatin (mp) | Carboxymethyl cellulose | | | Average particle diameter (microns) | | Formability of multi-nucleus capsule at 45° C. (%) | Controllability of particle size at 10° C. (%) |
| --- | --- | --- | --- | --- | --- | --- | --- | --- |
| | | viscosity (cp) | pH* | etherification degree | 45° C. | 10° C. | | |
| Example 19 | 28 | 9 | 6.9 | 0.76 | 8.6 | 10.0 | 86 | 84 |
| Example 20 | 28 | 18 | 6.8 | 1.00 | 10.5 | 13.2 | 80 | 91 |
| Example 21 | 32 | 6 | 6.6 | 0.76 | 7.3 | 9.5 | 77 | 85 |
| Example 22 | 49 | 3 | 5.7 | 0.77 | 10.1 | 14.0 | 72 | 85 |
| Example 23 | 49 | 3 | 5.7 | 0.77 | 9.2 | 10.3 | 89 | 80 |
| Control 7 | 16 | 920 | 7.2 | 0.94 | 3.1 | 10.8** | 29** | 70** |
| Control 8 | 16 | 710 | 7.2 | 0.76 | 3.2 | 11.0** | 29** | 70** |
| Control 9 | 22 | 685 | 7.0 | 0.76 | 3.4 | 8.3** | 41** | 72** |
| Control 10 | 28 | 630 | 6.9 | 0.76 | 3.5 | 10.1** | 35** | 65** |

(Note)
*pH of 1% aqueous solution.
**The test was carried out after removing gel, as the dispersion obtained in Controls was partially gelled.

What we claim is:

1. In a method for making oil-containing microcapsules for pressure-sensitive copying papers comprising the steps of:
   (1) preparing an aqueous system comprising an aqueous solution of gelatin and at least one anionic colloid material and oil droplets dispersed in said solution; (2) causing coacervation in said aqueous system at a temperature above the gelation point of said gelatin to form a coacervation suspension in which each of said oil droplets is surrounded by a coacervate; and
   (3) cooling said coacervate suspension to a temperature below the gelation point of said gelatin to form multi-nucleus capsules while subjecting said oil droplets each having a coacervate therearound to an agitation flow,
the improvement whereby multi-nucleus microcapsules having an average diameter within the range of 3 to 20 microns are formed and more than 75% of the microcapsule particles belong to the peak channel and its adjoining channels in the volume integration of particles measured by Coulter Counter, said improvement consisting essentially of
   (A) producing said agitation flow by rotating at least one agitator having at least one vane in a vessel containing said coacervate suspension under the following conditions:

$0.3 \leq (2a/D) < 1$ $0.05 \leq (Sp/ST) < 1$ $5 > n \leq 200$ wherein D is the maximum inner diameter of the vessel, a is the maximum radius of gyration of the agitator, ST is the maximum vertical sectional area of the coacervate suspension in the vessel, Sp is the total of the maximum vertical sectional area of the agitator vane rotating spaces and n is the number of revolutions per minute of the agitator; and
   (B) selecting said gelatin so that said gelatin has an average viscosity not larger than 35 millipoise in terms of the valuemeasured by the bloom pipette method at 40°±0.5° C. according to Japan Industrial Standard K6503 with respect to 6⅔% aqueous solution of said gelatin at the pH of 4.5 and at least 5% by weight of said gelatin has a viscosity not larger than 25 millipoise in the same terms as defined.

2. A method of making oil-containing microcapsules according to claim 1, in which the average viscosity of said gelatin in within the range of 15 to 35 millipoise in the same terms as defined.

3. A method of making oil-containing microcapsules according to claim 1, in which at least 10% by weight of said gelatin has a viscosity not larger than 25 millipoise in the same terms as defined.

4. A method of making oil-containing microcapsules according to claim 1, in which said gelatin consists of a single component having a viscosity not larger than 25 millipoise in the same terms as defined.

5. A method of making oil-containing microcapsules according to claim 1, in which said anionic colloid material is a cellulose derivative modified with carboxyl.

6. A method of making oil-containing microcapsules according to claim 5, in which said anionic colloid material is carboxymethylcellulose.

7. A method of making oil-containing microcapsules according to claim 1, in which the average diameter of said oil droplets is within the range of 1 to 10 microns.

8. A method of making oil-containing microcapsules according to claim 1, in which said coacervation is caused by dilution.

9. A method of making oil-containing microcapsules according to claim 8, in which water is added so as to reduce the colloid concentration in said system to 2 to 5% by weight to cause coacervation.

10. A method of making oil-containing microcapsules according to claim 1, in which said coacervation is caused by adjustment of the pH of said system.

11. A method of making oil-containing microcapsules according to claim 1, in which said anionic colloid material is selected from the group consisting of cellulose derivatives, gum arabic, carrageean, sodium alginate, carboxymethylated starch, phosphated starch, styrene-maleic anhydride copolymers and methylvinylether-maleic anhydride copolymers.

12. In a method for making oil-containing microcapsules for pressure-sensitive copying papers comprising the steps of:
   (1) preparing an aqueous system comprising an aqueous solution of gelatin and at least one anionic colloid material and oil droplets dispersed in said solution;
   (2) causing coacervation in said aqueous system at a temperature above the gelation point of said gelatin to form a coacervate suspension in which each of said oil droplets is surrounded by a coacervate; and (3) cooling and coacervate suspension to a temperature below the gelation point of said gelatin to form multi-nucleus capsules while subjecting said oil droplets each having a coacervate therearound to an agitation flow, the improvement whereby multi-nucleus microcapsules having an average diameter within the range of 3 to 20 microns are formed and more than 75% of the microcapsule particles belong to the peak channel and its adjoining channels in the volume integration of particles measured by Coulter Counter, said improvement consisting essentially of (A) producing said agitation flow by rotating at least one agitator having at least one vane in a vessel containing said coacervate suspension under the following conditions:

$$0.3 \leq (2a/D) < 1$$

$$0.05 \leq (Sp/ST) \leq 1$$

$$5 \leq n \leq 200$$

wherein D is the maximum inner diameter of the vessel, a is the maximum radius of gyration of the agitator, ST is the maximum vertical sectional area of the coacervate suspension in the vessel, Sp is the total of the maximum vertical sectional area of the agitator vane rotating spaces and n is the number of revolutions per minute of the agitator; and (B) selecting carboxymethylcellulose as said anionic colloid material wherein said carboxymethylcellulose has a viscosity within the range of 2 to 500 centipoise in terms of the value measured by the Brookfield viscometer with a 60 rpm No. 1 rotor with respect to a 2% aqueous solution of said carboxymethylcellulose at 25° C.

13. A method of making oil-containing microcapsules according to claim 12, in which said carboxymethylcellulose has a viscosity within the range of 3 to 100 centipoise in said terms of the value measured by the Brookfield viscometer.

14. A method of making oil-containing microcapsules according to claim 12, in which the average viscosity of said gelatin is not larger than 28 millipoise in terms of the value measured by the bloom type pipette method at 40°±0.5° C. according to Japan Industrial Standard K 6503 with respect to a 6⅔% aqueous solution of said gelatin at the pH of 4.5 and the viscosity of said carboxymethylcellulose is not larger than 18 centipoise in said terms of the value measured by the Brookfield viscometer.

15. A method of making oil-containing microcapsules according to claim 12, in which the average viscosity of said gelatin is not larger than 35 millipoise in said terms of the value measured by the bloom type pipette method and the viscosity of said carboxymethylcellulose is not larger than 10 centipoise in said terms of the value measured by the Brookfield viscometer.

16. A method of making oil-containing microcapsules according to claim 12, in which the average viscosity of said gelatin is not larger than 50 millipoise in said terms of the value measured by the bloom type pipette method and the viscosity of said carboxymethylcellulose is not larger than 6 centipoise in said terms of the value measured by the Brookfield viscometer.

17. A method of making oil-containing microcapsules according to claim 12, in which the average diameter of said oil droplets is within the range of 1 to 10 microns.

18. A method of making oil-containing microcapsules according to claim 12, in which said coacervation is caused by dilution.

19. A method of making oil-containing microcapsules according to claim 18, in which water is added so as to reduce the colloid concentration in said system to 2 to 5% by weight to cause coacervation.

20. A method of making oil-containing microcapsules according to claim 12, in which said coacervation is caused by adjustment of the pH of said system.

* * * * *